US010623497B2

(12) United States Patent
Thaler et al.

(10) Patent No.: US 10,623,497 B2
(45) Date of Patent: Apr. 14, 2020

(54) LEVERAGING PRE-EXISTING GROUPS FOR IOT DEVICE ACCESS

(71) Applicant: Microsoft Technology Licensing, LLC, Redmond, WA (US)

(72) Inventors: David G. Thaler, Redmond, WA (US); Justin Allen Hutchings, Issaquah, WA (US); Kevin M. Kane, Redmond, WA (US); Daniel Stelian Mihai, Issaquah, WA (US); Arvind R. Padole, Bothell, WA (US); Pawel R. Winogrodzki, Bellevue, WA (US); Greg M. Zaverucha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 15/291,026

(22) Filed: Oct. 11, 2016

(65) Prior Publication Data
US 2018/0103039 A1    Apr. 12, 2018

(51) Int. Cl.
*H04L 29/08*    (2006.01)
*H04L 12/24*    (2006.01)
*H04L 29/06*    (2006.01)
*H04W 12/00*    (2009.01)
*H04W 4/70*    (2018.01)

(52) U.S. Cl.
CPC .......... *H04L 67/12* (2013.01); *H04L 41/0806* (2013.01); *H04L 41/0893* (2013.01); *H04L 63/104* (2013.01); *H04W 12/0023* (2019.01); *H04W 4/70* (2018.02)

(58) Field of Classification Search
CPC ... H04L 63/101; H04L 63/0823; H04L 67/12; H04L 67/16
USPC ............................................................ 726/4
See application file for complete search history.

(56) References Cited

U.S. PATENT DOCUMENTS

| 2002/0026592 | A1* | 2/2002 | Gavrila ............... G06F 21/6218 726/6 |
| 2014/0109168 | A1* | 4/2014 | Ashley .................. G06F 21/552 726/1 |
| 2014/0244834 | A1 | 8/2014 | Guedalia et al. |
| 2015/0006695 | A1 | 1/2015 | Gupta |
| 2015/0237071 | A1 | 8/2015 | Maher et al. |
| 2015/0358332 | A1 | 12/2015 | Glickfield et al. |
| 2016/0105292 | A1 | 4/2016 | Choi et al. |
| 2016/0112433 | A1 | 4/2016 | Chung et al. |
| 2016/0165450 | A1 | 6/2016 | Hunt et al. |
| 2016/0285891 | A1* | 9/2016 | Byers .................. H04L 63/0884 |

OTHER PUBLICATIONS

Janak, et al., "On Access Control in the Internet of Things", In Journal of IAB Workshop on Smart Object Security, Feb. 15, 2012, pp. 1-3.

(Continued)

*Primary Examiner* — Malcolm Cribbs
*Assistant Examiner* — Angela R Holmes (57) ABSTRACT

The application is directed to a computer-implemented method and apparatus for provisioning an Internet of Things (IoT) device on an IoT network. The application is also directed to a method for managing access to functionality of an IoT device in a networked group.

20 Claims, 8 Drawing Sheets

(56) References Cited

OTHER PUBLICATIONS

Kaiwen, et al., "Attribute-Role-Based Hybrid Access Control in the Internet of Things", In Proceedings of Asia-Pacific Web Conference, Sep. 5, 2014, 4 pages.
"Access Control for Internet of Things", Published on: Sep. 6, 2015 Available at: https://www.intopalo.com/access-control-for-internet-of-things.
Zhang, et al., "An Extended Role Based Access Control Model for the Internet of Things", In Journal of International Conference on Information, Networking and Automation, vol. 1, Oct. 18, 2010, pp. 319-323.
Das, et al., "Context-Sensitive Policy Based Security in Internet of Things", In Proceedings of IEEE International Conference on Smart Service Systems, May 18, 2016, 6 pages.
Mordeno, et al., "Identity and Access Management for the Internet of Things—Summary Guidance", Retrieved on: Aug. 2, 2016 Available at: https://downloads.cloudsecurityalliance.org/assets/research/internet-of-things/identity-and-access-management-for-the-iot.pdf.
"AllJoyn™ Security 2.0 Feature High-Level Design", Retrieved on: Aug. 10, 2016 Available at: https://allseenalliance.org/framework/documentation/learn/core/security2_0/hld.
"Security 2.0", Retrieved on: Aug. 10, 2016 Available at: https://wiki.allseenalliance.org/core/security_enhancements.
Michele Turner; "Introducing Family Accounts and Home/Away Assist"; https://nest.com/blog/2016/03/10/introducing-family-accounts-and-home-away-assist/; Nest Labs; Mar. 2016; accessed Sep. 30, 2016; 5 pages.

* cited by examiner

Device Types – 200

Smartphones and communication devices
Computing devices
Connected Appliances
Connected Vehicles
Consumer Electronics
Connected Medical Devices
Gaming Devices
Home Automation and/or Security Systems
Device and/or Group Entities
Logical Components
TPSS Control, State, And/or Other Data

Identifiers – 208

IPv6 Addresses, MAC Addresses, etc.

Discovery Mechanisms 206

DNS-SD/mDNS for UPnP, SSDP for Bonjour, etc.

Service Layer 204

REST, SOAP, AllJoyn, WSDL, UPnP, Bonjour, etc.

Network Layer – 202
Network Communication Pathways
Routers, Hubs, Switches, Gateways, Firewalls, etc.
Network Protocols (e.g., IP, BLE, etc.)

USER TYPE IN FAMILY STRUCTURE   310

ADULT ____

MINOR ____

WORKER ____

LOCATION (GPS ENABLED)   320

USER EQUIPMENT A IS < 25 FEET AWAY

USER EQUIPMENT B IS < 50 FEET AWAY

USER EQUIPMENT C IS < 100 FEET AWAY

TIME OF DAY   330

MORNING

AFTERNOON

EVENING

Access to Functionality

Granted / Denied   340

LEVERAGING PRE-EXISTING GROUPS FOR IOT DEVICE ACCESS

TECHNICAL FIELD

This disclosure generally relates to leveraging an existing group structure, such as a family group structure, to create security groups for Internet of Things (IoT) devices on a network.

BACKGROUND

Generally, IoT is a concept whereby physical devices or user equipment embedded with electronics, sensors, software and network connectivity are able to collect and exchange information with one another. With the Internet increasingly becoming engrained in people's daily activities, more personal electronic devices are becoming interconnected. As a result, the IoT allows for an unprecedented collection of data relating to a user, facilitating an understanding of a user's environment, behavior, and/or how well various devices associated with the user perform.

Ensuring trust, privacy, safety, and/or security ("TPSS") within the IoT provides unique challenges. Traditional security and/or security management technologies may be difficult to implement in connected networks. This may be attributed, for example, to the use of ad hoc networks, a variety of controls, communications pathways/channels, etc. in an IoT that may be hidden from a user. This often leads to fewer IoT devices being implemented with TPSS.

Many conventional IoT networks do not have user-friendly attributes for sharing control of IoT devices. Users have to share their account credentials with members in their network, providing either full control or withholding access to selected functionalities. Moreover, many architectures lack functionality for managing permissions on a per-user basis. For those that do, each additional user must be manually added by users with administrative rights.

SUMMARY

This summary is provided to introduce a selection of concepts in a simplified form that is further described below in the Detailed Description. This summary is not intended to limit the scope of the claimed subject matter. The foregoing needs are met, to a great extent, by the present application directed to a process and apparatus for automating a patching process in a cloud computing platform.

One aspect of the application is directed to a computer-implemented method and apparatus for provisioning an Internet of Things (IoT) device on an IoT network. The method includes a step of discovering an IoT device that is available to join a group on the IoT network. The method also includes a step of accessing information indicative of preexisting roles and relationships for a group of users defined for a system or service other than the IoT device. The method also includes a step of reviewing information including a recommendation of privilege levels related to functionality of the IoT device. The method further includes a step of establishing a secure link between the group and the functionality of the IoT device. The method even further includes a step of creating an access control list for the IoT device based upon the information indicative of preexisting roles and relationships, the establishing step, and the reviewed recommendation of privilege levels related to the functionality of the IoT device.

Another aspect of the application is directed to a system for provisioning an IoT device. The system includes a processor and a memory operably coupled to the processor. The memory has instructions stored thereon that, when executed by the processor, cause the system to perform the instructions. One of the instructions includes accessing information indicative of preexisting roles and relationships for a group of users defined for a device other than the IoT device. Another instruction includes accessing information indicative of recommended privilege levels related to functionality of the IoT device. Yet another instruction includes creating an access control list based upon the preexisting roles and relationships and the recommended privilege levels related to the functionality of the IoT device.

Yet another aspect of the application is directed to a computer-implemented method for managing access to functionality of an IoT device in a networked group. The method includes a step of accessing information indicative of a group of users for which an access control list for the IoT device is to be determined. The method also includes a step of accessing preexisting information indicative of roles for the group of users. The preexisting information pertains to a function other than the functionality of the IoT device. The method further includes a step of accessing information indicative of recommended privilege levels related to the functionality of the IoT device. The method even further includes a step of generating the access control list based upon the preexisting information and the recommended privilege levels related to the functionality of the IoT device.

There has thus been outlined, rather broadly, certain aspects in order that the detailed description thereof may be better understood, and in order that the present contribution to the art may be better appreciated. There are, of course, additional aspects that will be described below and which will form the subject matter of the claims appended hereto.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION

A detailed description will be discussed in reference to various figures, and aspects herein. Although this description provides detailed examples of possible implementations, it should be noted that the details are intended to be examples and thus do not limit the scope of the technology described in this application.

Reference in this specification to "one aspect," "an aspect," "one or more aspects," or the like means that a particular feature, structure, or characteristic described in connection with the aspect is included in at least one aspect of the application. Moreover, the term "aspect" in various places in the specification is not necessarily referring to the same aspect. That is, various features are described which may be exhibited by some aspects and not by others.

General Architecture

Figure 1A:
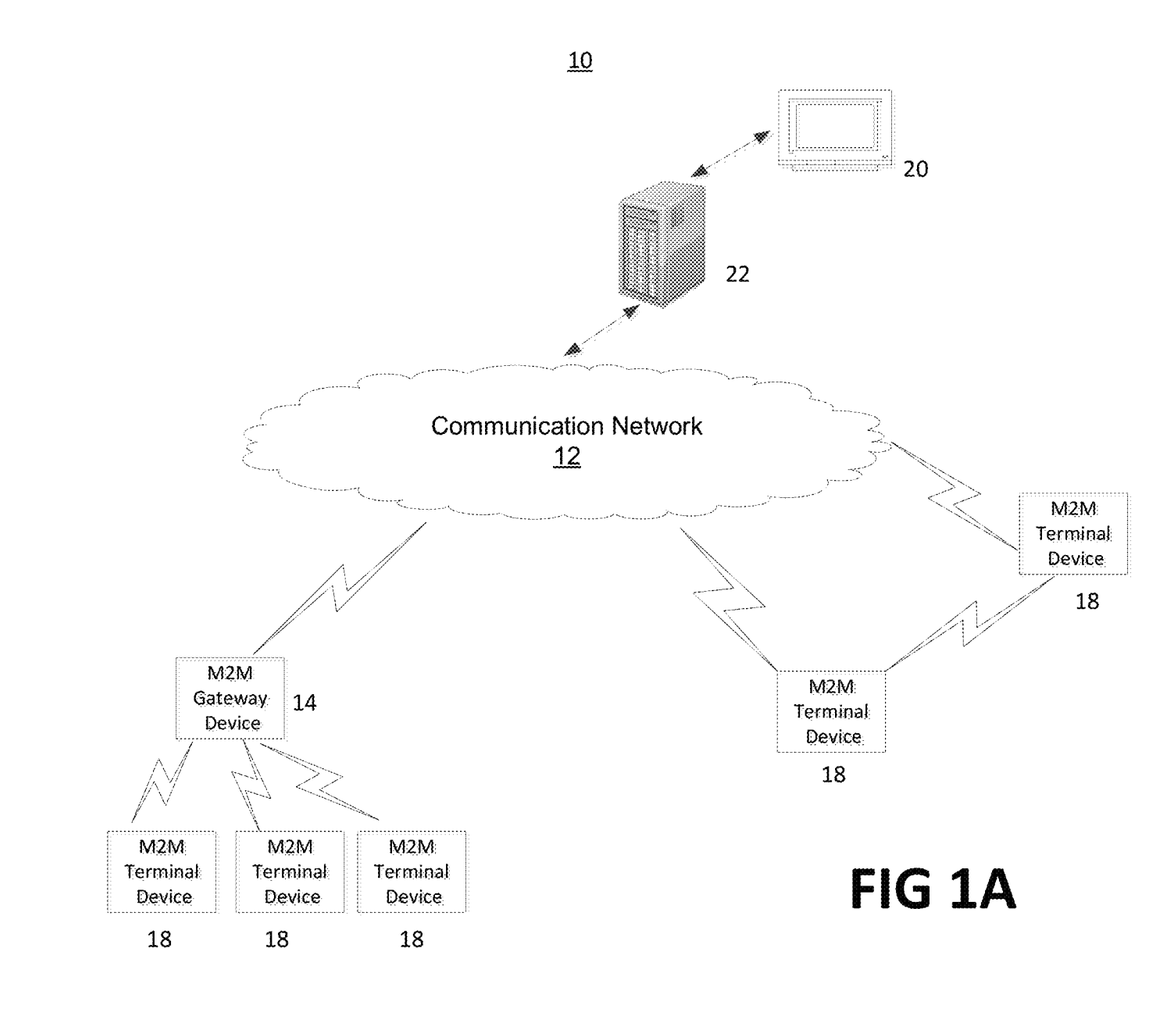
FIG. 1A illustrates a system diagram of an example machine-to-machine (M2M) or Internet of Things (IoT) communication system in which one or more disclosed embodiments may be implemented.

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may include multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a mesh network including a sensor network and personal area network, an industrial control network, a satellite network, a home network, or an enterprise network.

Figure 1B:
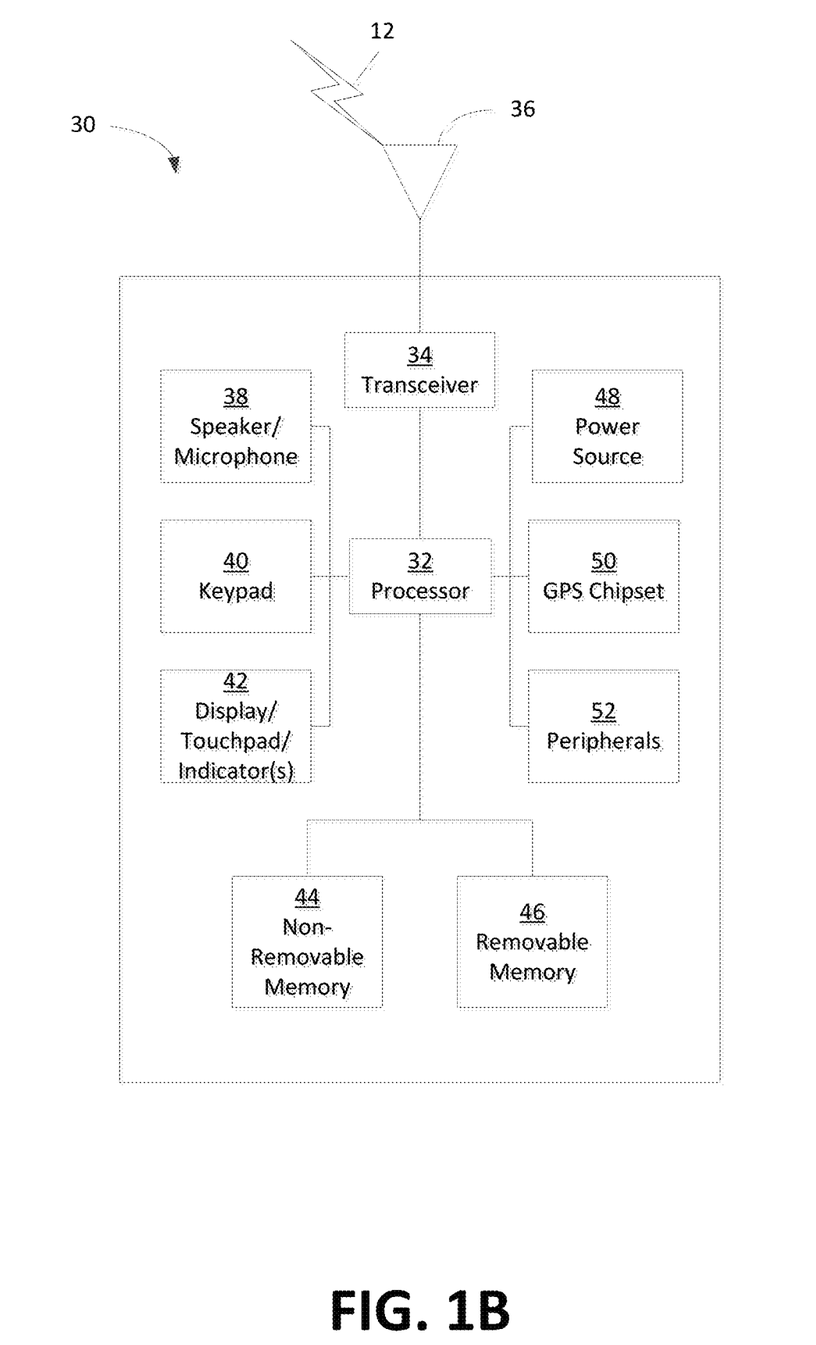
FIG. 1B illustrates an embodiment of the application of a system diagram of an example M2M device.

FIG. 1B is a system diagram of an exemplary IoT device 30, including for example in an embodiment, a IoT/M2M terminal device 18 or an IoT/M2M gateway device 14 for example. As shown in FIG. 1B, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the device 40 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 1B depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, a service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1B as a single element, the device 30 may include any number of transmit/receive elements 36. More specifically, the device 30 may employ MIMO technology.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 32 may receive power from the power source 48, and may be configured to distribute and/or control the power to the other components in the device 30. The power source 48 may be any suitable device for powering the device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
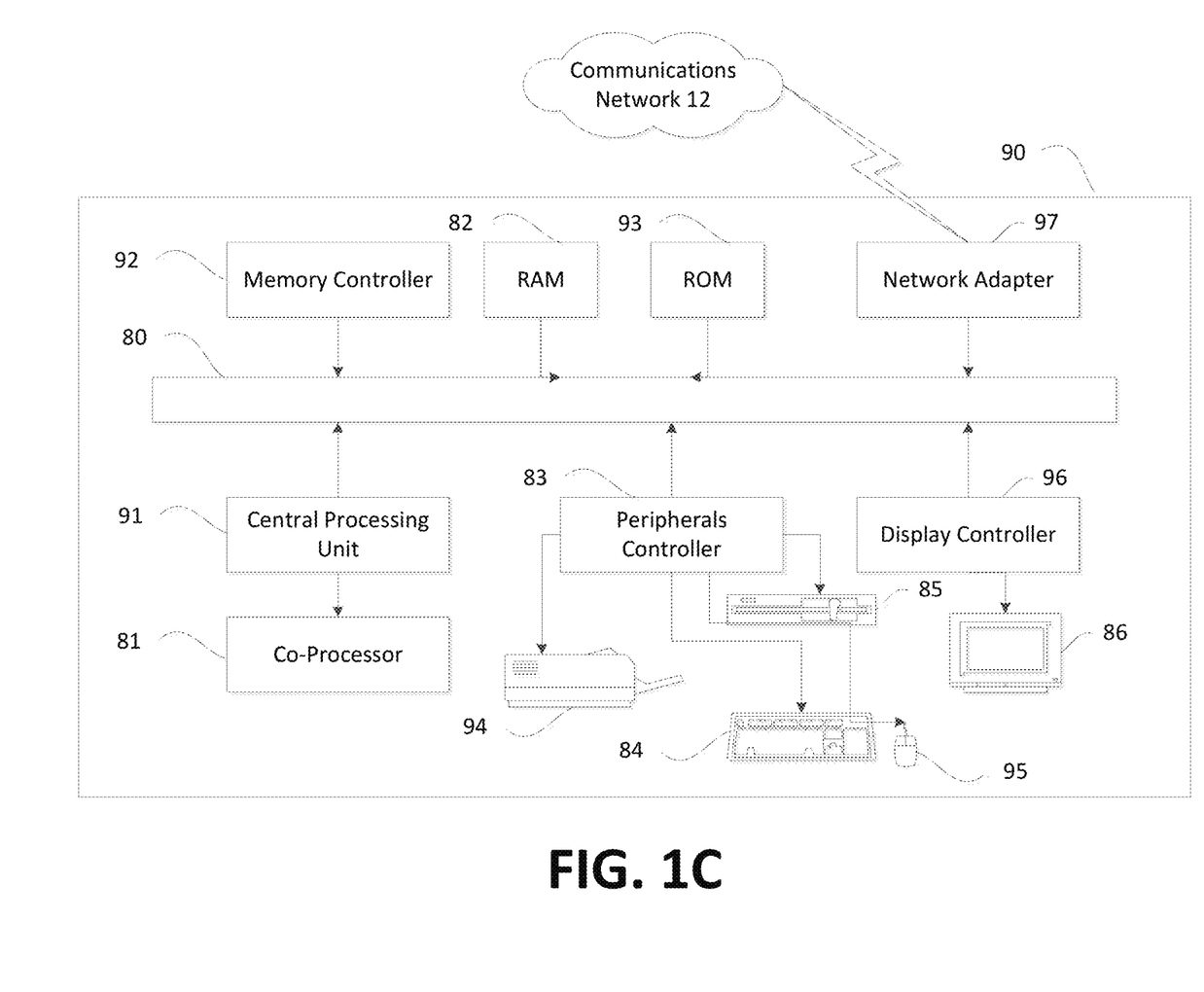
FIG. 1C illustrates an embodiment of the application of a block diagram of an example computing system.

FIG. 1C is a block diagram of an example computing system 90 on which, for example, a M2M service platform may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Display 86 may also include a graphical user interface such as disclosed in FIG. 3 for example. Further, computing system 90 may contain network adaptor 97 that may be used to connect computing system 90 to an external communications network, such as network 12 of FIG. 1A.

Connected Devices in a Network

Figure 1D:
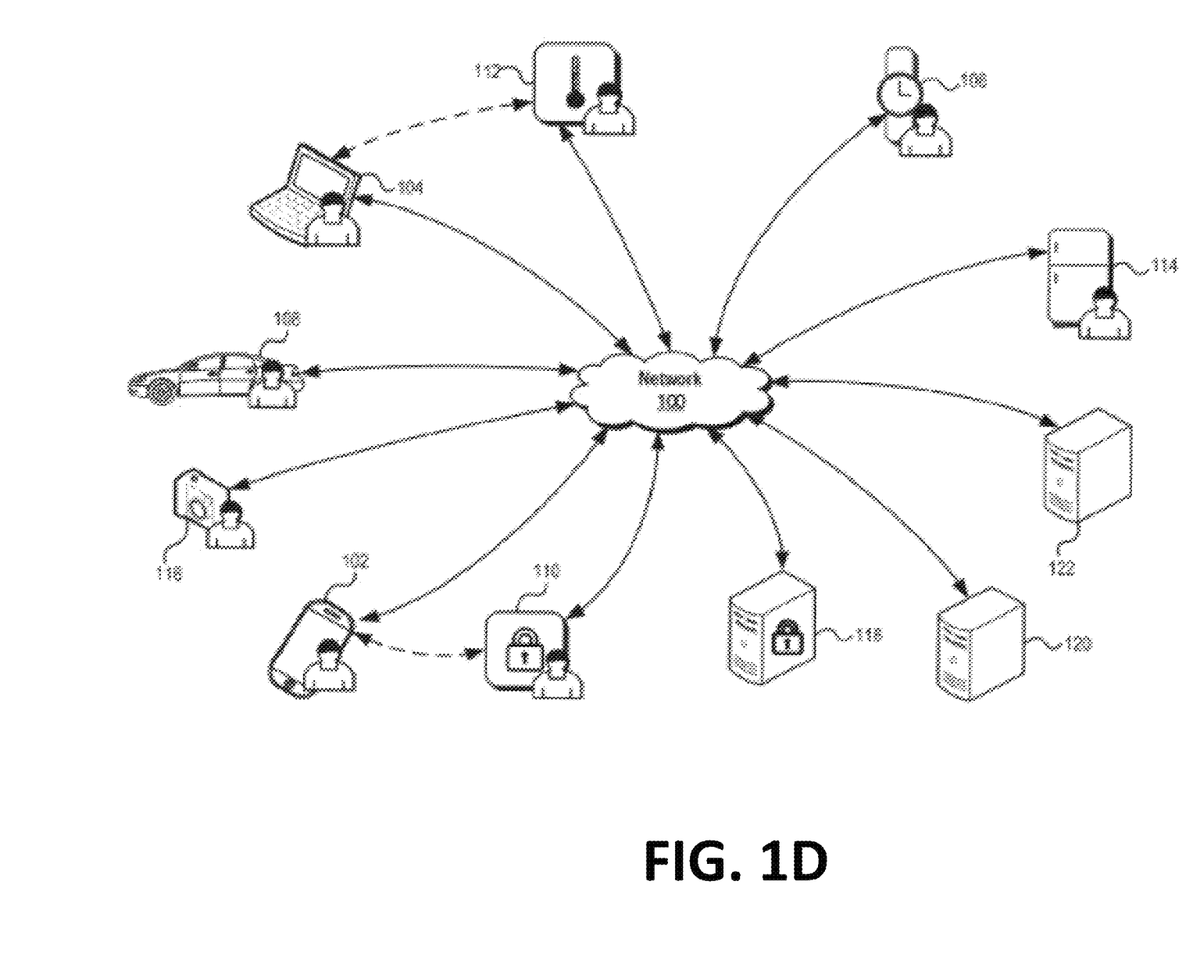
FIG. 1D illustrates a connected network of user equipment/IoT devices according to an aspect of the application.

FIG. 1D illustrates an example connected device network consistent with embodiments of the present disclosure. In certain embodiments, the connected device network includes an IoT associated with a user. A variety of connected systems and/or user equipment 102-122 may be communicatively coupled via one or more networks to form the personal IoT. The systems and/or user equipment 102-122 may be associated with a user, a group of users, a location, an entity and/or organization, one or more service providers, and/or any combination thereof.

The systems and/or user equipment 102-122 may include any suitable computing system or systems configured to implement embodiments of the systems and methods disclosed herein as provided in FIGS. 1A-1C. In certain embodiments, the systems and/or user equipment 102-122 may comprise at least one microprocessor-enabled system configured to execute instructions stored on an associated non-transitory computer-readable storage medium. In some embodiments, the systems and/or user equipment 102-122 may include a secure processing unit ("SPU") configured to perform sensitive operations such as trusted credential and/or key management, secure policy management, and/or other aspects of the systems and methods disclosed herein. In an example embodiment, the user equipment, e.g., IoT devices, may include the AllJoyn™ framework to support security feature requirements in the network. This framework may include access control lists (ACLs) which grant permission to users in the group.

A public key infrastructure (PKI) is employed in this application. Specifically, the PKI supports the distribution and identification of public encryption keys. The PKI enables users and computers to both securely exchange data over networks, such as for example the Internet, and verify the identity of the other party. Namely, the PKI is a set of roles, policies and procedures to create, manage, distribute, use, store and revoke digital certificates. Digital certificates are important in that they affirm the identity of the certified subject and bind that identity to the public key contained in the certificate.

For PKIs, a trusted party, also known as a certificate authority (CA), acts as the root of trust and provides services that authenticate the identity of individuals, computers and other entities. The CA issues digital certificates to entities and individuals after verifying their identity. The CA signs the certificates using its private key. The CA's public key is made available to all interested parties in a self-signed CA certificate. The CAs employ the trusted certificate to create a chain of trust.

The systems and/or user equipment 102-122 may further include software and/or hardware configured to enable electronic communication of information between the user equipment and/or systems 102-122 via one or more associated network connections 100. As illustrated in FIG. 1D, systems and/or user equipment 102-122 in a personal IoT may include, without limitation, a smartphone or other wireless communications device 102, a desktop and/or laptop computer system 104, a wearable computing device (e.g., a smartwatch, an activity and/or fitness monitoring device, etc.) 106, a connected vehicle 108 and/or systems associated with the same (e.g., a passenger vehicle, aircraft, boat, train, and/or telematics and/or infotainment systems associated with the same, etc.), a home automation and/or security system and/or components associated with the same (e.g., security keypads, networked locks 110, gate and/or other access control devices, connected lighting, etc.), connected thermostats 112, HVAC systems, irrigation systems, water controls, pumps, heaters, home utility meters, home network gateways, activity sensors, alarms (e.g., fire and/or CO2 alarms), a tablet computer, wireless control devices (e.g., keyless entry or remote start devices, etc.), gaming or other entertainment devices, connected home appliances (e.g., refrigerators 114, washing machines, ranges, toasters, etc.), consumer electronic devices (e.g., a bathroom scale, a digital camera 116, speaker systems, televisions, etc.), medical devices (e.g., pacemakers, insulin pumps, blood sugar monitors, etc.), and/or any other computing system and/or device as well as associated status and/or data stores.

In a separate embodiment, the personal IoT may further include one or more service provider systems 118-122. In certain embodiments, the one or more service provider systems 118-122 may communicate, directly or indirectly, with a variety of the systems and/or user equipment 102-116 included in the personal IoT. In some embodiments, the one or more service provider systems 118-122 may provide information to, and/or receive information from, the systems and/or devices 102-116 (e.g., data collected by the systems and/or devices 102-116, control information for controlling the function and/or operation of the systems and/or devices 102-116, etc.). For example, a user may use a smartphone 102 to interface with a service provider system 118 associated with a home security company via network 100 to control the state of a networked lock 110 associated with his or her home security system. The user may further view information relating to a status and/or state of the networked lock 110 from the service provider system 118. As another example, service provider system 120 may include a personalized cloud storage system, such as described in the '603 application, that stores data received from devices 102-116 and facilitates the use and management thereof.

The systems and/or devices 102-122 may be communicatively coupled via one or more connections to network 100. For example, as discussed above, a user may remotely communicate with a networked lock 110 and/or an associated service provider system 118 using a smartphone 102 via one or more network connections 100. In further embodiments, systems and/or devices 102-122 in the personal IoT may directly communicate without the use of any intermediate network connections (e.g., via a proximal field communication channel and/or the like). For example, as illustrated, a user may communicate with a networked lock 110 directly using a smartphone 102 and/or communicate with a connected thermostat 112 directly using a laptop computer system 104.

The network connections 100 may comprise a variety of network communication devices and/or channels and may use any suitable communications protocols and/or technologies for facilitating communication between the connected devices and systems. In some embodiments, the network connections 100 may, for example, comprise the Internet, a local area network, a virtual private network, and/or any other communication network or combination of networks using one or more electronic communication technologies and/or standards (e.g., Ethernet or the like). The network connections 100 may use multiplexers, routers, hubs, gateways, firewalls, switches and/or any other network communication devices and/or systems to facilitate communications on the networks. In some embodiments, the network connections 100 may comprise a wireless carrier system such as a personal communications system ("PCS").

In a further embodiment, the network connections 100 may comprise an analog mobile communications network and/or a digital mobile communications network using, for example, code division multiple access ("CDMA"), Global System for Mobile Communications or Group Special Mobile ("GSM"), frequency division multiple access ("FDMA"), and/or time divisional multiple access ("TDMA") technologies. In certain embodiments, the network connections 100 may incorporate one or more satellite communication links. In yet further embodiments, the network connections 100 may use IEEE's 902.11 standards, Bluetooth®, ultra-wide band ("UWB"), Zigbee®, near field communications (NFC) technologies, and or any other suitable technology or technologies.

Device Types/Entities

Figure 2:
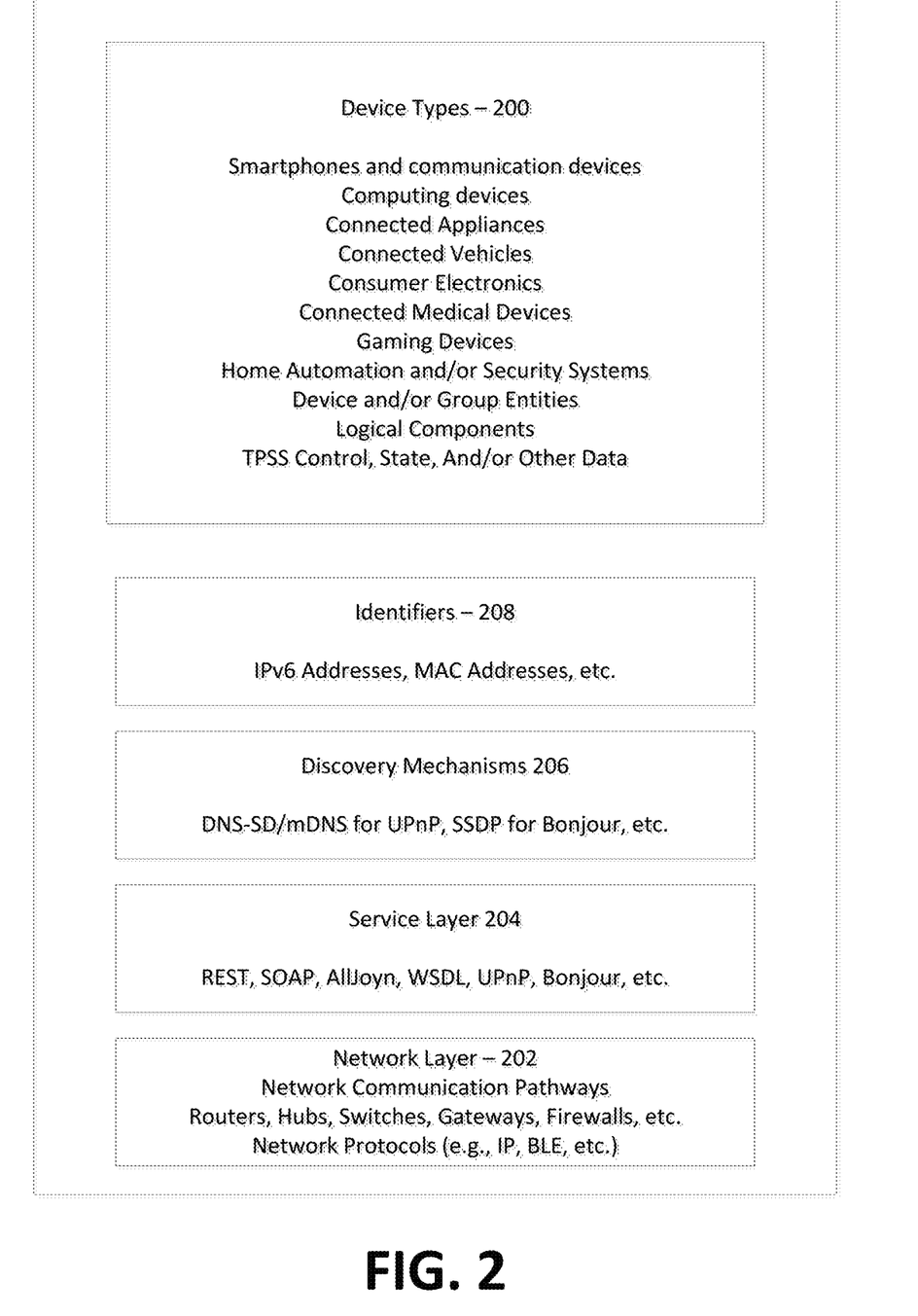
FIG. 2 illustrates an example network diagram illustrating a computing system with cloud applications according to the application.

According to an embodiment, a variety of systems, devices, entities, and/or groups of entities in a network may be associated with a device architectural types/entities 200 shown in FIG. 2. In certain embodiments, constituent entities and/or groups of entities (e.g., sensors, processors, controllers, boxes, etc.) associated with a particular system and/or device may further be associated with the device type/entity 200. In certain embodiments, identifying systems, devices, entities, and/or groups of entities included in the device type/entity 200 may involve determining whether systems, devices, entities, and/or groups of entities comprise a physical "thing" within an IoT ecosystem or a logical component of a larger component and/or "thing" and/or identifying what is a smallest indivisible component in the architecture.

In connection with implementing trust management systems and methods, the device type/entity 200 may be used to determine who and what are the logical and identifiable principals in the overall personal IoT network. In certain embodiments, the device entity 200 may include, among other things, information identifying associated systems, devices, entities, and/or groups of entities, and/or information related to associated TPSS-relevant controls, state, and/or other data.

Network Layer

The means by which various systems, devices, entities, and/or groups of entities and/or associated service providers (e.g., local and/or cloud-based service providers) in an IoT ecosystem communicate may be associated with a network architectural layer 202. In certain embodiments, TPSS methods consistent with embodiments disclosed herein may be implemented above the network layer 202. In further embodiments, TPSS methods consistent with the disclosed embodiments may be implemented through various network layers 202 and/or be compatible with a variety of network communication protocols. In some embodiments, implementing TPSS methods above the network layer 202 may, among other things, reduce dependence on certain administrative aspects of implementing network security.

Embodiments disclosed herein may be utilized in connection with a variety of network communication protocols including, for example, Internet Protocol ("IP") and/or Bluetooth Low Energy ("BLE"), although other network protocols are also contemplated. As an IP medium, WiFi is a common network technology that may be utilized in connection with the disclosed embodiments. Existing WiFi networks, however, may not implement particularly intuitive and/or secure mechanisms for managing network access. Accordingly, systems and methods disclosed herein may provide for more intuitive methods for users to manage various networks associated with a personal IoT. For example, certain embodiments may provide for more user-friendly mechanisms of provisioning devices with shared WiFi Protected Access ("WPA") keys.

Service Layer

The means by which various systems, devices, entities, and/or groups of entities and/or associated service providers expose services in an IoT ecosystem may be associated with a service architectural layer 204. The service layer 204 may comprise information relating to which device, entities, and/or groups of entities and/or associated service providers expose services as well as how such services are described, discovered, and/or invoked. A variety of scalable service architectures including, for example Representational State Transfer ("REST") services over HTTP, SOAP, AllJoyn, WSDL, etc. may be utilized in connection with the disclosed embodiments. In some embodiments, administration of TPSS within a personal IoT ecosystem may be performed in connection with the service layer 204. It is envisaged in this application that a service layer is different from an app. The service layer constitutes a framework such as described above, while an app eposes device specific services over the service layer.

Discovery Mechanisms

A discovery mechanism 206 may describe how devices, entities, and/or groups of entities and/or associated services may be discovered on a network within the personal IoT ecosystem. A variety of protocols/mechanisms may be associated with the discovery mechanism 206 including, for example, SSDP for Universal Plug and Play ("UPnP"), DNS-SD/mDNS for Bonjour, WS-Discovery for Web Services for Devices (WSDs), and/or the like. In some embodiments, service discovery protocols may be used that allow for implementation of improved security and/or access policies relative to conventional protocols, including, for example and without limitation, the service discovery techniques described in the '387 patent. In certain embodiments, systems and methods disclosed herein may provide for bootstrapping security when new devices, entities, and/or groups of entities and/or services are introduced to the personal IoT ecosystem.

Identifier

Within a personal IoT ecosystem, identification of various IoT ecosystem elements including, without limitation, systems, devices, entities, groups, users, and/or the like may be included in an identifier 208. Device and service identification may use a variety of technologies including, for example IPv6 addresses, MAC addresses, etc. Consistent with certain embodiments disclosed herein, principals, devices, and/or services of a personal IoT ecosystem may operate in a policy-managed environment. Associated policies may describe which entities—including individual persons or users—have access to which resources and/or under what conditions such access is permitted. Among other things, this may involve management of user identities on the network and/or reliably associating security attributes with user identities.

Provisioning an IoT Device/App

According to an aspect of the application, architectures are disclosed for provisioning an IoT device/app on a network. Described herein are ways to leverage existing defined relationships and roles to automatically provide a security configuration for an IoT network. For example, existing relationships and roles defined for family members using a phone data plan, an XBox Live plan, content sharing plan (e.g., Netflix), etc. Based on the preexisting relationship definitions, desired security settings and groupings for an IoT device may be automatically generated. For example, parents may be classified as home network administrators, and children may be classified as limited users. The generated settings and groupings may be mapped to recommended security settings for the IoT device. The recommended security settings may be provided using a standardized methodology for device providers to identify the recommended security settings. For example, a manufacturer may identify certain capabilities as "high security—admin only" and others as "low security—open access". The mapped security features may be implemented on the IoT device using a chain of trust.

As will be readily understood throughout this application, the described user equipment and IoT devices are synonymous with each other and include components and features described above in regard to FIG. 1C. It is understood that a single function device, such as a temperature sensor, is considered to be one application (app). Conversely, a multi-function device, such as a smartphone, is considered to include plural apps. Each of these apps includes a separate key in regards to belonging to a security group.

In an embodiment, after a device is deployed, a service provider on a server such as in FIG. 1D or in the cloud, performs the provisioning, e.g., configuring, steps in order for the device wishing to join a group on the network. The group may be referred to as a "security group." The security group includes a logical grouping of devices/apps and users that are defined by a security manager. For example, the security group may be named, "Living Room" and refer to all users and apps/devices communicating with a particular IoT device, such as for example a smart TV. The group is uniquely defined by a global unique identifier (GUID) and the public key of a security manager. IoT devices/apps may become members of the security group when they are issued a membership certificate for the group.

The policy/policies for a specific app on an IoT device generally are set up by the security manager. Depending upon the policy/policies set up for the security group, users/peers of a specific type, for example, ALL, ANY_TRUSTED, FROM_CERTIFICATE_AUTHORITY, WITH_PUBLIC_KEY, and WITH_MEMBERSHIP, may/may not have access to the Living Room security group. The policies may include managed and managing groups of users/peers. In one embodiment, the policies are obtained by an admin/security manager from a service or cloud provider to obtain policies for a family. This helps delineate members of the family with managed rights, e.g., kids, from members of the family with managing rights, e.g., adults. The service provider may additionally communicate with the IoT device to understand its capabilities to properly installing groups and policies thereon. In an alternative embodiment, user equipment in the network may be configured to perform the provisioning steps of an IoT device wishing to join a group on the network.

According to an embodiment, the service/security provider or an IoT device in the group may review functionality relating to the new IoT device wishing to join the group on the network. The functionality may include the types of functionality present on the IoT device. For example, the types of functionality may include, but are not limited to, controlling features of a security alarm, heating/air system, or lights in a home, and changing administrative passwords.

Subsequent to or prior to reviewing the information/capabilities of the new IoT device wishing to be provisioned in a particular security group, a predefined hierarchy of users may be obtained by the service provider (or another IoT device in the security group). In an embodiment, the security group may be based upon a family structure. The family structure may be obtained from the Microsoft family service. The family may be organic in nature, e.g., parents, children, etc. or inorganic, e.g., residents, non-residents, etc. The family structure provides different levels of access to users to control one or more functionalities of an app running on an IoT device in the network. That is, users may have varying degrees of privilege to access (read only), control, and/or modify settings of one or more functionalities of apps running on an IoT device in the network.

In this embodiment, the functionality includes the access, controllability and modification of settings for the IoT devices in the network. For example, the functionality may include modifying passwords of security systems, controlling which windows and/or doors in a residence/facility are armed, turning the security system off/on, viewing areas within a home via a camera setup, updating the schedule of lights in home/facility, modifying which lights turn off/on, updating the home/away settings of a heating and cooling system, unlocking a safe, opening or closing garage or other automatic doors, and the like.

In an embodiment, the service provider or IoT device in the security group may determine a root of trust for the IoT device to be provisioned. The root of trust may be performed by a security protocol as described in reference to the AllJoyn™ system. In the AllJoyn™ example, one or more roots of trust are provided to an IoT device during security provisioning and are implemented as a list of public keys. All other identities in the network must chain to one of these public keys in order to be considered trusted.

In an exemplary embodiment, the process may be automatically performed between IoT devices, thus reducing latency and improving accessibility. In an embodiment, group memberships, roles, etc. are assigned to the IoT device once a root of trust is established. In an exemplary embodiment, an IoT app is assigned roles or group memberships based upon information about the user who is using the app. For example, the status in the family structure may include designations by age including an adult and minor, or parent and child. The status in the family structure may also include designations of a worker and a family member, e.g., adults, minors, parents, and child. The status of the user determines the requisite permissions for controlling one or more functionalities of devices in the network.

In one embodiment, for example, an adult may have administrative rights to modify passwords or control settings of a system, such as for an alarm system, heating/cooling system, or the lighting functions. Alternatively, a minor may have restricted rights in comparison to an adult. In other words, minors may have none or some of the rights provided to an adult. For example, the minor may have read-only rights, or rights to control settings to a limited degree. As will be understood to those of ordinary skill, an adult has all of the rights provided to a minor.

In yet a further embodiment, adults in the family structure may also be provided with different administrative privileges. For instance, while a child attending college may be of legal age, e.g., an adult, the designation of child in the family structure may still be adhered to therefore resulting in restricted privileges. This may be clear with an example of a firearm in the home with a smart gun safe lock. Thus, a parent trying to gain access to the smart gun safe lock, either directly or via another IoT device, may be permitted, while other adults in the home may be denied access. It is envisaged according to an embodiment of this application that the child of legal age may, however, be provided with more rights than a child who is a minor.

In yet even a further embodiment, the designation may be based upon a household employee/worker type. For instance, an employee/worker may include a nanny, a pet sitter, a cleaner, a gardener, etc. The worker may have limited rights to functionality of IoT devices in the network. For instance, the worker may be provided rights to open a specific door, e.g., front door, and denied rights to other doors such as a parent's bedroom door, or change the temperature in a home/facility within a prescribed range. In one embodiment, a family member, whether an adult or minor, may have privileges for one or more functionalities exceeding those provided to the worker. In an alternative embodiment, the privileges of the worker for one or more functionalities may exceed those provided to a minor. This model could also extend to a more typical office environment, where a worker has rights to control the climate or lighting at her office, but not to neighboring offices.

Figure 3:
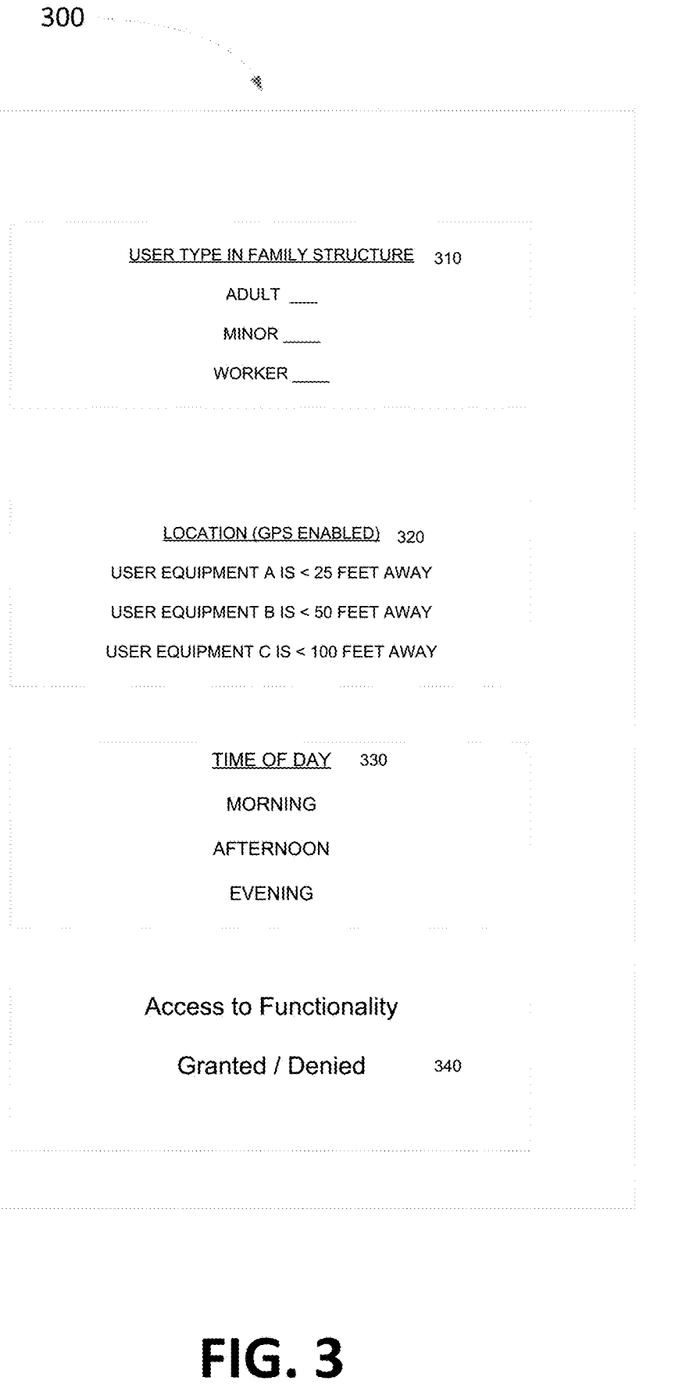
FIG. 3 illustrates an example graphical user interface of an IoT device/user equipment according to an aspect of the application.

In an embodiment, a GUI 300 of a display of an IoT device as shown above in FIG. 1C is described. Here, the GUI 300 may be directly located on display of an IoT device, such as a smart home thermostat, or alternatively, may be the GUI 300 of an application displayed on a display of another IoT device in the network, e.g., smartphone of parent. As illustrated in box 310, the identity of the user may be provided such that the IoT device can see whether the user has access to one or more functionalities of the device.

In yet another embodiment, the assigned rights may be time dependent. That is, the rights afforded to specific users may change depending upon the time of day. For example, a worker, such as a nanny, may have permission to control functionality of the smart locks in order to enter and leave the home during business hours. After business hours, e.g., 6:00 pm onward, the nanny's rights to enter the home are denied. In the aforementioned example, an admin/adult can modify the access rights provided to the nanny to ensure the locks open at other times of the day, e.g., evening, if schedules change. The GUI 300 in FIG. 3 may also include box 330 which recognizes the rights of the user depending upon the time of day.

In yet even another embodiment, the assigned rights may also be location specific. In so doing, the GUI 300 can show the proximity of the IoT device trying to gain access to the IoT device having the specific functionality, e.g., smart lock on front door. For example, if the worker is accessing the functionality of the IoT device via user equipment A (see box 320) from a location that is greater than a predetermined distance, e.g., 25 feet, the smart lock will not open. Hence, the smart lock requires the user equipment of the Worker (with restricted privileges) to be in close proximity to the smart lock door (IoT device) in the network.

In yet a further embodiment, the GUI 300 in FIG. 3 displays which users are granted access and which users are denied access (box 340). Box 340 may also show a log/history of users accessing the IoT device. More specifically, the log/history can show which functionality was accessed. This may be helpful to an administrator with unrestricted access who is remotely monitoring security of the IoT device. In another embodiment, the GUI 300 may provide the administrator or other user with an option to modify the security settings generated for the IoT device. As will be readily understood to those skilled in the art, any of the above-mentioned embodiments may include functionality of IoT devices that is remotely viewed, accessed, controlled and/or modified.

According to a further embodiment, the predefined hierarchy of ACL may be based upon a family or household structure. This data may be provided via a database of devices and associated recommendations for security settings. The recommendations may be provided using a standardized methodology. For example, a manufacturer may identify certain capabilities as "high security—admin only" and others as "low security—open access". This data may be provided to the service provider or user equipment via crowd sourcing. The data may also be provided via machine learning, e.g., rights provided to users based upon right provided for similar functionality of other IoT devices. Even further, the data may be provided by an administrator of the group.

In an embodiment of this application, the communications between IoT devices in the network may occur in the absence of the Internet. For example, a network may be established at a cabin in a remote area. Here, the devices may interact with one another over Bluetooth technology, an ad-hoc Wi-Fi network, or a regular access point-based Wi-Fi network. Specifically, one of the IoT devices may act as the administrator and provision all other devices in the network.

Figure 4:
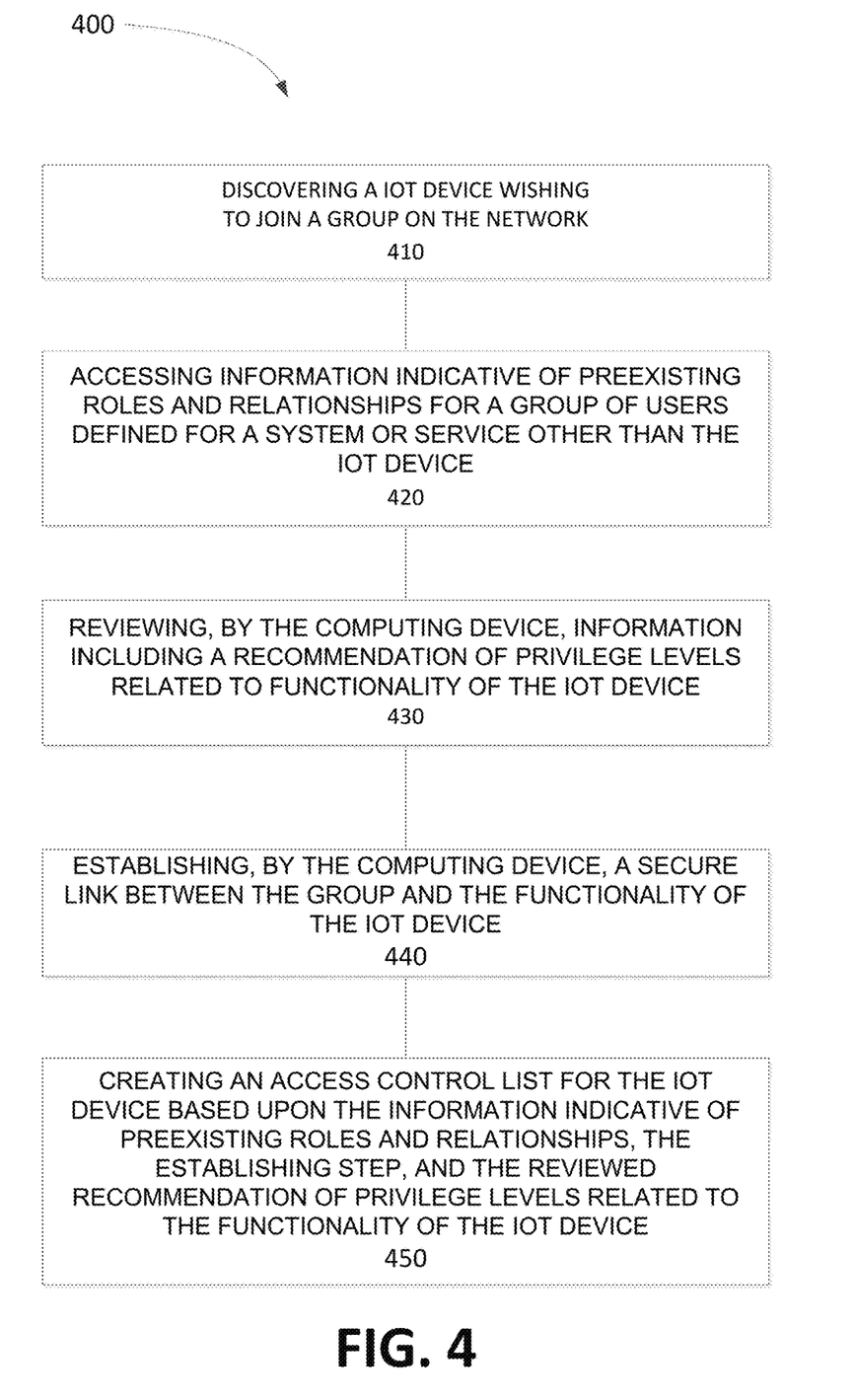
FIG. 4 illustrates a method for provisioning an IoT device according to an aspect of the application.

FIG. 4 illustrates another aspect of the application directed to a method 400 for provisioning, e.g., configuring, an IoT device to a group on a network. According to the method 400, a step is provided for discovering the IoT device wishing to join a group on the network (410). The discovery can either be from a request from the network or security manager to locate other IoT devices wishing to join the security group, or alternatively, from an IoT device contacting the network via the security manager for gaining access to the security group.

The method also includes a step of accessing information indicative of preexisting roles and relationships for a group of users defined for a system or service other than the IoT device (420). The recommendation of privilege levels may be received directly from the IoT device being provisioned. Alternatively or additionally, the recommended privilege levels may be obtained from crowd sourcing, machine learning or a predefined mapping of similar devices to assign proper privilege levels to one or more functionalities of the IoT device. It is envisaged that each application is associated with a particular functionality. For example, if the IoT device is a smart TV, recommendations may be provided for a functionality/application for accessing particular kinds of channels, HBO, Showtime, etc. to managing groups, e.g., parents in a family structure, while other channels such as Cartoon Network or Nickelodeon may be accessed by both managed, e.g., children, and managing groups. A separate functionality/application of the smart TV may be directed to changing passcodes for parental controls which may be restricted to managing groups.

The method also includes a step of reviewing, by the computing device, information including a recommendation of privilege levels related to functionality of the IoT device (430). The group may be a family structure. Alternatively, the group may be any hierarchy based upon age or position/title. Further, the method includes a step of establishing, by the computing device, a secure link between the group and the functionality of the IoT device (440). Further, the method includes a step of creating an access control list for the IoT device based upon the information indicative of preexisting roles and relationships, the establishing step, and the reviewed recommendation of privilege levels related to the functionality of the IoT device (450).

In a further embodiment, another IoT device(s) may be updated based upon the installed groups in the IoT device. By so doing, the other IoT device may be able to communicate with the provisioned IoT device. For example, if a smart lightbulb was provisioned according to the method described above, a pre-existing, provisioned IoT device, such as for example a motion sensor, would be permitted communicate to communicate with the smart lightbulb to read motion data.

Assigning Permissions to a User

Figure 5:
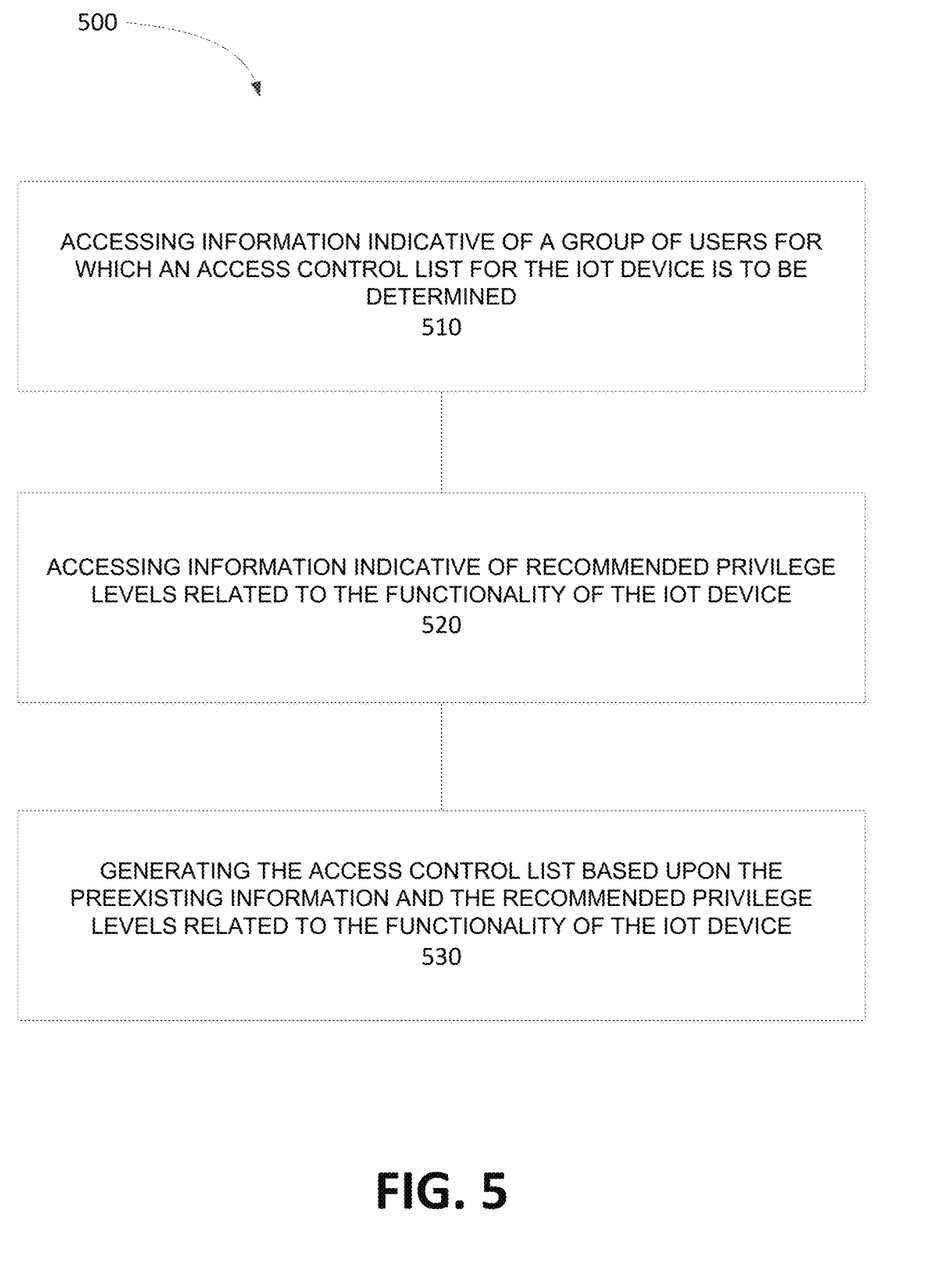
FIG. 5 illustrates a method for operating an IoT device according to an aspect of the application.

FIG. 5 is directed to another aspect of the application directed to a method 500 for assigning appropriate permissions to a user for accessing one or more functionalities of an IoT device (provisioned) in a networked group. According to the method 500, a step is provided for accessing information indicative of a group of users for which an access control list for the IoT device is to be determined (510). The method also includes a step for accessing information indicative of recommended privilege levels related to the functionality of the IoT device (520). Next, the IoT device generates the access control list based upon the preexisting information and the recommended privilege levels related to the functionality of the IoT device (530). In one embodiment of this aspect, a status of managing is provided with administrative rights to the functionality of the IoT device. If the group is a family, a parent would be provided with administrative rights. Alternatively, the status of managed is provided with restricted rights to the functionality of the IoT device. Of course, this depends upon the specific functionality of the IoT device, where, as described above, the IoT device may provide recommended privilege levels which are mapped to the existing group's hierarchy, e.g., family hierarchy structure.

While certain example embodiments have been described, these embodiments have been presented by way of example only and are not intended to limit the scope of the described disclosure herein. Thus, nothing in the foregoing description is intended to imply that any particular feature, characteristic, step, module or block is necessary or indispensable. Indeed, the novel methods and systems described herein may be embodied in a variety of other forms. Furthermore, various omissions, substitutions and changes in the form of the methods and systems described herein may be made without departing from the spirit of the disclosure described herein.

What is claimed is:

1. A computer-implemented method for provisioning an Internet of Things (IoT) device on an IoT network, the method comprising:

discovering, by a computing device, an IoT device that is available to join a group on the IoT network;

accessing, by the computing device, information indicative of preexisting roles and relationships for a group of users defined for a system or service other than the IoT device, the preexisting roles and relationships defining a hierarchy for the group of users, the hierarchy for the group of users defined by different members of a family including a status of the different members in a family structure;

reviewing, by the computing device, information including a recommendation of privilege levels related to functionality of the IoT device;

establishing, by the computing device, a secure link between the group and the functionality of the IoT device, the secure link including a certificate in a public key infrastructure and based in part on a secure root of trust that is enforced both when the IoT device is connected to a communication network and not connected to the communication network; and creating automatically, by the computing device, an access control list for the IoT device based upon the information indicative of preexisting roles and relationships, the establishing step, and the reviewed recommendation of privilege levels related to the functionality of the IoT device.

2. The method of claim 1, wherein the preexisting roles and relationships are based in part on the secure root of trust wherein assigned roles or group memberships are based upon information about the user who is using the IoT device, including the status in the family structure that includes at least one of designations by age including an adult and a minor, or a parent and a child, or designations of a worker and a family member.

3. The method of claim 2, wherein:
the family structure includes a status of managing and managed,
the status of managing provides administrative rights to the functionality of the IoT device, and
the status of managed provides restricted rights to the functionality of the IoT device, wherein the preexisting roles and relationships comprise relationships of members within the family structure including the parent and the child, the child having privileges that are more restricted than the parent, such that parent is classified as a home network administrator and the child is classified as a limited user.

4. The method of claim 1, wherein the recommendation of privilege levels is provided by the IoT device and based on the preexisting roles and relationships, automatically generating desired security settings and groupings for the IoT device to thereby automatically provide a security configuration for the IoT network.

5. The method of claim 1, wherein the recommendation of privilege levels is obtained from crowd sourcing, machine learning or predefined privilege levels, and the recommendation of privilege levels is mapped to the hierarchy for the group of users.

6. The method of claim 1, wherein the recommendation of privilege levels is obtained from a standardized database of devices and associated security recommendations.

7. The method of claim 1, wherein the certificate is a digital certificate issued by a certificate authority (CA) and employed to create a chain of trust.

8. The method of claim 1, further comprising:
installing, by the computing device, the access control list on the IoT device.

9. The method of claim 8, further comprising:
updating an access control list of another IoT device in the group to communicate with the IoT device.

10. A system for provisioning an IoT device, the system comprising:
a processor; and
a memory operably coupled to the processor, the memory having instructions stored thereon that, when executed by the processor, cause the system to:
access information indicative of preexisting roles and relationships for a group of users defined for a device other than the IoT device, the preexisting roles and relationships defining a hierarchy for the group of users, the hierarchy for the group of users defined by different members of a family including a status of the different members in a family structure;
access information indicative of recommended privilege levels related to functionality of the IoT device;
establish a secure link between the group and the functionality of the IoT device, the secure link including a certificate in a public key infrastructure and based in part on a secure root of trust that is enforced both when the IoT device is connected to a communication network and not connected to the communication network; and
create automatically an access control list based upon the preexisting roles and relationships and the recommended privilege levels related to the functionality of the IoT device.

11. The system of claim 10, wherein the family structure is defined by different members including a parent, an adult child, and a minor child.

12. The system of claim 10, wherein the recommendation of privilege levels is provided by the IoT device.

13. The system of claim 10, wherein the recommendation of privilege levels is obtained from crowd sourcing, machine learning or predefined privilege levels.

14. The system of claim 10, wherein the memory includes a further instruction stored thereon, that when executed by the processor, causes the system to:
install the access control list on the IoT device.

15. A computer-implemented method for managing access to functionality of an IoT device in a networked group, the method comprising:
accessing information indicative of a group of users for which an access control list for the IoT device is to be determined;
accessing preexisting information indicative of roles for the group of users, wherein the preexisting information pertains to a function other than the functionality of the IoT device and to preexisting roles and relationships that define a hierarchy for the group of users, the hierarchy for the group of users defined by different members of a family including a status of the different members in a family structure;
accessing information indicative of recommended privilege levels related to the functionality of the IoT device;
establishing a secure link between the group and the functionality of the IoT device, the secure link including a certificate in a public key infrastructure and based in part on a secure root of trust that is enforced both when the IoT device is connected to a communication network and not connected to the communication network; and
generating automatically the access control list based upon the preexisting information and the recommended privilege levels related to the functionality of the IoT device.

16. The method of claim 15, wherein the roles are based upon the family structure defined by different members including a parent, an adult child, and a minor child.

17. The method of claim 15, wherein the recommended privilege levels for the functionality are provided by the IoT device.

18. The method of claim 15, wherein the recommended privilege levels are accessed via a database for maintaining privilege information for a plurality of IoT devices.

19. The method of claim 15, wherein the access control list is further generated based on crowd sourcing or machine learning.

20. The method of claim 15, further comprising rendering a user interface configured to allow a user to modify the generated access control list.

* * * * *